March 29, 1966 J. A. DINWIDDIE 3,243,472
CATALYTIC PROCESS EMPLOYING PULSED VAPOROUS FEED AND
CONTINUOUSLY FLOWING INERT VAPOROUS CARRIER
Filed Feb. 10, 1958

INVENTOR.
JAMES A. DINWIDDIE,
BY
ATTORNEY.

3,243,472
CATALYTIC PROCESS EMPLOYING PULSED VAPOROUS FEED AND CONTINUOUSLY FLOWING INERT VAPOROUS CARRIER
James A. Dinwiddie, Baytown, Tex., assignor, by mesne assignments, to Esso Research and Engineering Company, Elizabeth, N.J., a corporation of Delaware
Filed Feb. 10, 1958, Ser. No. 714,097
6 Claims. (Cl. 260—680)

This invention relates to an improved method for conducting a catalytic conversion process. More particularly, this invention relates to an improved method for conducting a catalytic conversion process in order to maximize the formation of desired conversion products.

In conducting catalytic liquid or vapor phase conversion processes a limitation in reaction efficiency is frequently imposed by the chemical equilibrium which is established during the course of the catalytic treating operation, by catalytically or thermally promoted side reactions, etc.

In accordance with the present invention, this problem is overcome through the provision of a process for the catalytic conversion of a fluent feed stock in the presence of a finely divided solid conversion catalyst wherein a fluent carrier is continuously unidirectionally flowed through at least a segment of an elongate bed of said catalyst under treating temperature and pressure conditions and wherein pulses of fluent feed stock are periodically introduced into said carrier whereby continuous fractionation of at least a portion of the components of the ensuing reaction mixture will occur, such fractionation being obtained as a consequence of differences in the rate of travel of reaction mixture components through the segment of the catalyst bed, such differences in rate of travel being occasioned by differences in the volatility, absorptivity, heat of chemisorption, etc., of the said components.

The process of the present invention may be employed advantageously with respect to fluent phase catalytic processes for the conversion of fluent reactants in the presence of solid conversion catalysts wherein the reaction mixture that is formed contains at least one component having a rate of travel through a bed of finely divided catalyst different from the rate of travel of other components. Thus, the dehydrogenation of olefinic, aliphatic, and naphthenic hydrocarbons may be effected with improved results in the presence of a finely divided dehydrogenation catalyst such as chromia, molybdena, or platinum supported on a high surface area carrier such as alumina or an essentially $Fe_2O_3$ catalyst comprising 70 to 80 percent $Fe_2O_3$, 3 percent $Cr_2O_3$, and 17 to 29 percent $K_2CO_3$. Similarly, combined isomerization-dehydrogenation reactions may be conducted in the presence of finely divided solid isomerization-dehydrogenation catalysts such as platinum or palladium on gamma alumina. As another example, combined dehydrogenation-condensation reactions (i.e., dehydrogenation-alkylation reactions) may be effected. Still further examples of processes which may be advantageously conducted in accordance with the present invention include processes for the catalytic separation of deuterium from HD, etc. Representative specific examples are the dehydrogenation of propane to propylene, the dehydrogenation of butane to butene, the dehydrogenation of butenes to butadiene, the dehydrogenation of cyclohexane to form benzene, the combined isomerization and dehydrogenation of normal pentane to isopentene to isoprene, the combined isomerization-dehydrogenation of methylcyclopentenes and methylcyclopentanes to cyclohexanes and aromatic hydrocarbons, the combined dehydrogenation-condensation of propane or propane-butane mixture to form $C_6$ to $C_8$ hydrocarbons predominantly, etc. Conventional conversion processes of the type mentioned above are described in greater detail in references known to those skilled in the art, such as "The Chemistry of Petroleum Hydrocarbons," vol. 2, published by Reinhold Publishing Corp., 1955, wherein conventional conversion conditions and catalysts for processes of the type contemplated by the present invention are described in greater detail. Therefore, in the interest of clarity of disclosure, this specification will not be burdened with known details of this nature, since the specific conversion conditions and specific catalyst compositions to be employed for any given catalytic conversion process are known to those skilled in the art, and since the present invention is concerned with an improved method for conducting such processes.

The carrier to be employed in accordance with the present invention may comprise a liquid or gaseous medium. The carrier is inert with respect to the catalytic conversion to be effected. The carrier should be in the same state as the feed material. Thus, the carrier should be volatilized for vapor phase conversion processes.

Thus, for vapor phase reactions substantially chemically inert non-polar gases such as nitrogen, helium, etc. may be employed widely whereas gaseous mediums containing or consisting substantially of materials such as steam, flue gas, carbon dioxide, carbon monoxide, and even oxygen, hydrogen, hydrogen sulfide, gaseous hydrocarbons, etc. may be employed.

In accordance with the present invention, a solid conversion catalyst is utilized, such catalyst being employed in a finely divided condition and preferably being supported on a high surface area, preferably microporous carrier such as activated gamma alumina, etc. Although the state of subdivision of the catalyst particles and the porosity thereof may be varied within wide limits, depending on the nature of the catalytic conversion to be effected, it is generally preferable to employ a particulate catalyst having a particle size within the range of 3 to 60 mesh (0.25″ to 0.01″).

The particulate catalyst is arranged within an elongate conversion zone and the carrier is continuously flowed therethrough whereas the feed material is periodically introduced. The desired conversion conditions of temperature and pressure are maintained within the conversion zone with appropriate auxiliary equipment such as pumps, preheaters, etc. The rate of flow of the carrier through the conversion zone and the length of the conversion zone should be sufficient to provide for a feed material contact time sufficient to provide for the desired degree of conversion and sufficient to permit at least partial fractionation of at least one component of the reaction mixture during passage through the conversion zone.

The time interval between feed injections should be correlated with conversion zone length and carrier flow rate in order that the slower moving components of an initial pulse of reactants are not substantially overtaken by, and thus substantially admixed with, the faster moving components of the next following pulse of reactants.

Numerous advantages are obtained with the process of the present invention. The advantages are particularly pronounced in the case of conversion operations wherein a reversible chemical equilibrium limits the degree of formation of a desired conversion product, for in this situation it is possible through the provision of the process of the present invention to continuously maintain a constantly changing chemical equilibrium in the conversion zone whereby, for a given set of conversion conditions, the effective equilibrium is "shifted to the right." Accordingly, for a constant set of conversion conditions a greater rate of net conversion may be obtained or, conversely, for a given degree of conversion, milder operating conditions may be employed to thereby inhibit or even suppress undesired side reactions.

The invention will be further illustrated in connection with the accompanying drawing wherein.

Figure 1:
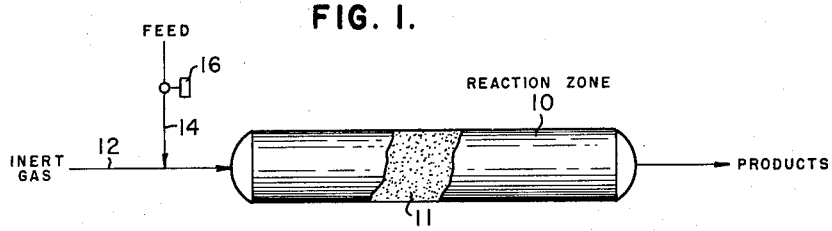
FIG. 1 is a schematic flow sheet illustrating, generally, the manner in which the present invention is practiced.

Turning now to FIG. 1, there is schematically disclosed a reaction zone 10 containing a bed of finely divided solid contacting agent 11. A flowing stream of an inert fluent carrier (i.e., a gas such as nitrogen, helium, flue gas, steam, benzene, etc.) is continually introduced into the reaction zone 10 by way of a charge line 12. The feed stock to be at least partially converted within the reaction zone 10 is periodically introduced thereinto by means of a charge line 14 controlled by a time actuated valve 16. As a consequence, pulses of the feed stock are periodically injected into the flowing stream of inert gas. Each pulse of feed stock, on entering the reaction zone 10, is brought into catalytic contact with a solid treating agent to effectuate at least partial chemical conversion thereof. The reaction components having the fastest rate of travel through the reaction zone 10 will be at least partially separated from slower moving components. As a consequence, the reaction products will be continuously physically at least partially separated from one another as they are evolved whereby a constantly changing (e.g., disturbed) chemical equilibrium will be continuously maintained. As a consequence, the effective equilibrium will be "shifted to the right" whereby the efficiency of conversion will be substantially enhanced.

Figure 2:
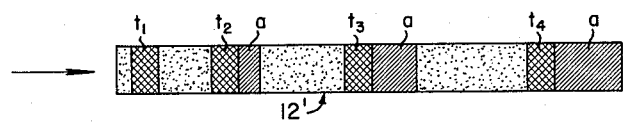
FIG. 2 is a schematic showing of the manner in which a disturbed equilibrium is continuously maintained in accordance with the present invention.

This is schematically shown in FIG. 2. With reference to FIG. 2, a pulse of feed stock, on entering the reaction zone 10, will have an equilibrium composition at an instant of time $t_1$ when the catalytic conversion is initiated. At a subsequent period of time $t_2$, a lighter reaction component $a$ formed during an interval of time $t_2-t_1$ will have become physically separated from other components. As a consequence, further reaction of the feed stock components will occur during the period of time $t_2-t_1$ with the further formation of component $a$. Consequently, at periods of time $t_3$, $t_4$, etc., progressively larger amounts of components $a$ will have been formed and will have been separated from the feed stock components whereby a disturbed equilibrium will be continuously maintained.

Figure 3:
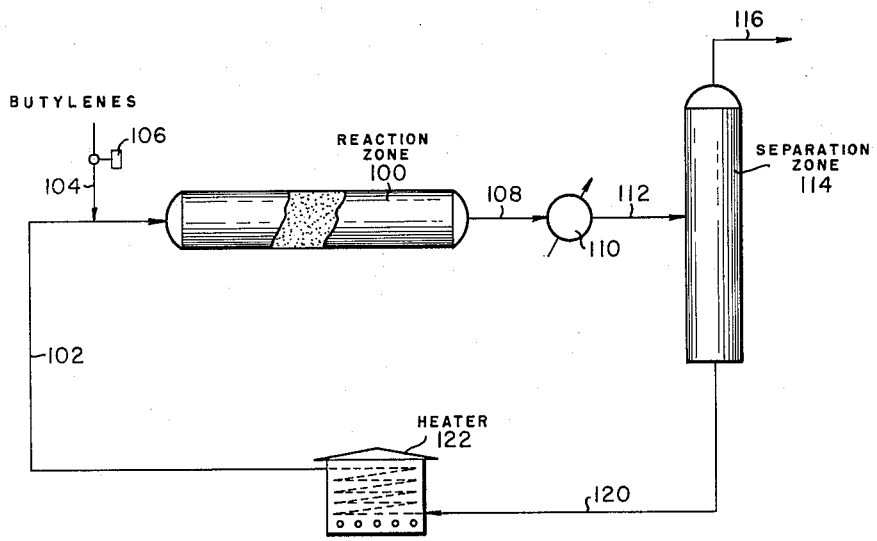
FIG. 3 is a schematic flow sheet illustrating one manner in which the process of the present invention may be practiced in a continuous phase.

Turning now to FIG. 3, there is schematically shown one manner in which the process of the present invention may be practiced in a continuous manner. The process will be illustrated with respect to the dehydrogenation of butylenes to butadiene although it will be understood by those skilled in the art that the reaction sequence may be continuously practiced with respect to a wide variety of processes for treating liquefiable fluent feed stocks with finely divided solid conversion catalysts.

In accordance with this modification, an elongate reaction zone 100 is provided which is filled with a bed of finely divided dehydrogenation catalyst (e.g., 70 to 80 percent $Fe_2O_3$, 3 percent $Cr_2O_3$, and 17 to 27 percent $K_2CO_3$). A gas which is substantially completely inert to the dehydrogenation reaction, such as steam, is continuously charged to the reaction zone 100 by way of a charge line 102. Pulses or "bursts" of a butylenes feed are periodically injected into the charge line 102 by way of a feed line 104 controlled by a time actuated valve 106. The rate of flow of the carrier gas may be, for example, correlated with respect to the length of the reactor to provide for a 5-second contact time for the butylenes feed stock. Each pulse of feed, on entering into the reaction zone 100, is brought into catalytic contact with the catalyst whereby a portion of the butylene is dehydrogenated to form butadiene and hydrogen. The hydrogen will pass through the reaction zone 100 at a rate which is different from the rate of passage of the $C_4$ components of the ensuing reaction mixture. Accordingly, a disturbed equilibrium condition will be maintained within the reaction zone 100 and, as a consequence, an enhanced conversion of butylenes to butadiene may be effected.

The carrier gas, hydrogen, unreacted butylenes, and butenes are discharged from the reaction zone by way of a line 108 leading into cooling zone 110 wherein the steam may be condensed. The condensed water, together with the hydrocarbon components, flow from the cooler 110 by way of a line 112 to a separation zone 114 wherein the hydrocarbon components are separated from the condensed water. Thus, the hydrogen and hydrocarbon components may be discharged from the zone 114 by way of a line 116 leading to a fractionation zone of any suitable construction (not shown) for separation and recovery of the reaction components.

Condensed water is continuously withdrawn from the zone 114 by way of a line 120 leading to a heating zone 122 wherein the water is volatilized to form steam for the charge line 102. It will be understood that the valve 106 will be actuated in a manner such that at the outlet end of the reaction zone 100 the reaction component having the slowest rate of travel will be physically separated from the component of the next following burst having the fastest rate of travel.

The invention will be further illustrated by the following specific examples which are given by way of illustration and not intended as limitations on the scope of this invention.

The following experiments were conducted in a reactor 18 inches long having an internal diameter of 0.215 inch and a volume of about 10.7 cc. The reaction zone was filled with a catalyst consisting of about 3 weight percent of $Cr_2O_3$, 26 percent $K_2CO_3$, and about 71 percent $Fe_2O_3$. The catalyst had been pretreated with helium at a temperature of about 1100° F.

*Example I*

A stream of helium was flowed through the reaction zone at the rate of about 1.9 liters per hour at a temperature of about 700° F. Pulses consisting of 0.2 cc. (gaseous) of butylenes per pulse were periodically injected into the flowing stream of helium. The products from the reaction zone were analyzed. A conversion of about 32 percent of the feed per pass was obtained with a selectivity of butadiene of about 100 percent.

When the experiment was repeated at a temperature of 740° F., about a 51 percent conversion was obtained with a 92 percent selectivity to butadiene.

When the experiment was repeated at a temperature of about 760° F. and a helium flow rate of about 2.3 liters per hour, about a 58 percent conversion of the butylenes was obtained with a 96 percent selectivity to butadiene. Under these flow conditions, at a temperature of 775° F., a 55 percent conversion of butylenes was obtained with an 86 percent selectivity to butadiene.

The results are truly remarkable in that in a conventional fixed bed type operation of the type employed commercially, the conversion of the butylenes at a temperature of about 1150° F. with the above-described catalyst is within the range of about 20 to 30 percent. Furthermore, at persent commercial temperatures, substantial quantities of undesirable light hydrocarbons are formed from the butylenes feed stock. However, in contrast, no such components were found with respect to the above-described experiments. Thus, chromatographic analysis of the total reaction product indicated that the product consisted essentially of $C_4$ hydrocarbons and was substantially completely free from lighter hydrocarbon components.

Example II

Helium heated to a temperature of about 860° F. was flowed through the above-described reactor at the rate of about 1.3 liters per hour and pulses of about 0.2 cc. of butane were periodically introduced into the flowing stream of helium. The catalyst in this instance was hydrogen treated 3.7 percent $Cr_2O_3$–96.3 percent $Al_2O_3$. In this experiment, about a 60 percent conversion of the butane was obtained with a selectivity to butenes of 66 percent.

When the experiment was repeated at a temperature of about 890° F., a conversion of about 52 percent was obtained with about a 75 percent selectivity to butenes.

The results obtained are truly remarkable in that, for example, with a conventional fixed bed reactor wherein evolved hydrogen is not separated from other reaction components during passage through the bed of catalyst, a butane conversion of about 20 to 30 percent is obtained only at a much higher temperature of about 1150° F. and at this temperature significant hydrocracking of the butane occurs.

In copending Dinwiddie and Morgan application Ser. No. 714,091, now U.S. Patent No. 2,976,132, filed of an even date herewith and entitled "Improved Fixed Bed Type Reactor," there is disclosed and claimed a reactor which may be utilized with particular utility in practicing the process of the present invention. Such reactor comprises an annular conversion zone defined by inner and outer coaxial shell members, means for continuously passing a carrier fluid through all increments of the annular catalyst bed and a rotating feed distributor mounted on a drive shaft coaxial with the shell members for continuously introducing a feed material as the distributing arm is rotated, whereby the thus-introduced feed components form a flow path through the annular conversion zone which is in the form of a helix.

Having described my invention, what is claimed is:

1. In a method for the separation of components formed in the vapor phase catalytic chemical conversion of a vaporous feed material in a conversion zone in the presence of a finely divided catalytically active solid, the improvement which comprises continuously unidirectionally flowing an inert vaporous carrier through said conversion zone under conversion conditions, periodically introducing pulses of said vaporous feed material into said vaporous carrier for sequentially pulsed flow through said conversion zone under said conversion conditions to obtain continuous separation of one of the components from another of the components formed by conversion of said material in said conversion zone, said one of the components having a rate of travel through said conversion zone different from the rate of travel of said another of the components, said feed material being introduced into said conversion zone in pulses of sufficient duration separated by a sufficient time to prevent intermingling of said components formed by said conversion, and thereafter recovering said components from said carrier, said vaporous carrier being inert to said solid and to said chemical conversion.

2. In a method for the separation of dehydrogenated products formed in the catalytic dehydrogenation of a volatilized aliphatic hydrocarbon in a conversion zone in the presence of a finely divided supported dehydrogenation catalyst, the improvement which comprises the steps of continuously unidirectionally passing a carrier gas inert to said dehydrogenation reaction and to said catalyst through said conversion zone under conversion temperature and pressure conditions, periodically introducing pulses of said volatilized aliphatic hydrocarbon into said carrier gas to obtain sequential pulsed flow of said volatilized aliphatic hydrocarbon through said conversion zone to thereby obtain continuous separation of evolved hydrogen from said feed stock in said conversion zone, and separating dehydrogenated products and hydrogen from said carrier gas subsequent to passage of feed materials in said conversion zone, said dehydrogenated products and hydrogen having different rates of travel through said conversion zone, said volatilized aliphatic hydrocarbon being introduced into said conversion zone in pulses of sufficient duration separated by a sufficient time to prevent intermingling of said dehydrogenated products and hydrogen.

3. A method as in claim 2 wherein the aliphatic is a butylene.

4. A method as in claim 2 wherein the catalyst is an iron oxide catalyst promoted with chromium and potassium oxides, wherein the feed material comprises a butylene and wherein the dehydrogenation reaction is conducted at a temperature within the range of about 700° to 800° F.

5. A method as in claim 2 wherein the catalyst is an alumina-supported chromic oxide catalyst, wherein the feed material is a paraffinic hydrocarbon, and wherein the dehydrogenation reaction is conducted at a temperature within the range of about 850° to 900° F.

6. A method as in claim 5 wherein the paraffin is butane.

References Cited by the Examiner
UNITED STATES PATENTS

| | | | |
|---|---|---|---|
| 2,307,434 | 1/1943 | Veltman | 196—52 |
| 2,439,934 | 4/1948 | Johnson et al. | 260—683.3 |
| 2,509,900 | 5/1950 | Wormith | 260—680 |
| 2,603,591 | 7/1952 | Evans | 196—50 |
| 2,604,495 | 7/1952 | Erkko | 260—683.3 |
| 2,618,667 | 11/1952 | Hanson | 260—683.3 |
| 2,666,086 | 1/1954 | Pitzer | 260—683.3 |
| 2,848,521 | 8/1958 | Polk | 260—680 |
| 2,884,473 | 4/1959 | Reilly et al. | 260—680 |
| 2,916,444 | 12/1959 | Vernon | 260—680 |

PAUL M. COUGHLAN, *Primary Examiner.*

ALLAN M. BOETTCHER, MILTON STERMAN,
*Examiners.*

F. M. VANRIET, *Assistant Examiner.*